(12) United States Patent
Frotz et al.

(10) Patent No.: US 9,150,121 B2
(45) Date of Patent: Oct. 6, 2015

(54) ADJUSTING MECHANISM, IN PARTICULAR IN THE INTERIOR FITTINGS AREA OF A MOTOR VEHICLE

(75) Inventors: Thomas Frotz, Burscheid (DE); Rudolf Hemmelrath, Leverkusen (DE)

(73) Assignee: Johnson Controls Technology Company, Holland, MI (US)

( * ) Notice: Subject to any disclaimer, the term of this patent is extended or adjusted under 35 U.S.C. 154(b) by 268 days.

(21) Appl. No.: 13/820,288

(22) PCT Filed: Sep. 9, 2011

(86) PCT No.: PCT/EP2011/004552
§ 371 (c)(1),
(2), (4) Date: Apr. 26, 2013

(87) PCT Pub. No.: WO2012/031772
PCT Pub. Date: Mar. 15, 2012

(65) Prior Publication Data
US 2013/0200235 A1    Aug. 8, 2013

(30) Foreign Application Priority Data

Sep. 10, 2010 (DE) .......... 10 2010 044 946

(51) Int. Cl.
*B60N 2/02* (2006.01)
*B60N 2/16* (2006.01)
*B60N 2/46* (2006.01)
(Continued)

(52) U.S. Cl.
CPC .............. *B60N 2/02* (2013.01); *B60N 2/1615* (2013.01); *B60N 2/4626* (2013.01); *B60N 2/4805* (2013.01); *B60N 2/4864* (2013.01); *F16M 13/022* (2013.01)

(58) Field of Classification Search
CPC .... B60N 2/4864; B60N 2/4867; B60N 2/482; B60N 2/4826; B60N 2/4885; B60N 2/42781; B60N 2/464; B60N 2/1615; B60N 2/162; B60N 2/02; B60N 2/4626; B60N 2/4805; B60N 2/4823; B66F 3/12; B66F 11/042; F16M 11/38; F16M 2200/061; F16M 2200/063; F16M 2200/047; F16M 13/022; A47C 23/00
USPC .......... 248/585, 593, 595, 564, 620; 267/103, 267/105–107, 109
See application file for complete search history.

(56) References Cited

U.S. PATENT DOCUMENTS 1,893,098 A * 1/1933 Murray, Jr. et al. ........... 267/109
4,926,760 A * 5/1990 Sack ............................. 108/145
(Continued)

FOREIGN PATENT DOCUMENTS

DE   102006036623   B3   10/2007
DE   102007041495   B3   11/2008
(Continued)

OTHER PUBLICATIONS

International Search Report for application No. PCT/EP2011/004552 mailed Jan. 25, 2012.
(Continued)

*Primary Examiner* — Ingrid M Weinhold
(74) *Attorney, Agent, or Firm* — Fletcher Yoder, P.C.

(57) ABSTRACT

The invention relates to an adjusting mechanism, in particular in the interior fittings area of a motor vehicle, in which a support structure is movable relative to a base element.

7 Claims, 2 Drawing Sheets

(51) Int. Cl.
*B60N 2/48* (2006.01)
*F16M 13/02* (2006.01)

(56) References Cited

U.S. PATENT DOCUMENTS

2006/0290186 A1* 12/2006 Maruyama et al. ........ 297/344.1
2007/0262631 A1    11/2007 Hartlaub
2008/0035717 A1*  2/2008 Turvey et al. ............ 229/117.02
2009/0121526 A1*  5/2009 Akaike et al. ............ 297/216.12

FOREIGN PATENT DOCUMENTS

| FR | 2927581 | A1 | 8/2009 |
| WO | 2006037801 | A1 | 4/2006 |
| WO | 2007056640 | A2 | 5/2007 |

OTHER PUBLICATIONS

PCT International Preliminary Report on Patentability mailed Mar. 21, 2013.

* cited by examiner

ADJUSTING MECHANISM, IN PARTICULAR IN THE INTERIOR FITTINGS AREA OF A MOTOR VEHICLE

CROSS REFERENCE TO RELATED APPLICATIONS

This application claims priority from and the benefit of PCT Application No. PCT/EP2011/004552, filed on Sep. 9, 2011; and German Patent DE 10 2010 044 946.6, filed on Sep. 10, 2010; both entitled "Adjusting Mechanism, In Particular In the Interior Fittings Area of a Motor Vehicle", which are herein incorporated by reference.

BACKGROUND

The present invention relates to an adjusting mechanism, in particular in the interior fittings area of a motor vehicle, in which a supporting structure can be moved relative to a base element.

Such adjusting mechanisms are known from the prior art and are used in automotive construction, for example in the area of head restraints. The adjustment of the head restraint usually takes place manually and serves to increase the comfort and/or the safety of the seat occupant. The adjustment or the adjusting mechanism must be able to be implemented and produced in as simple and cost-effective a manner as possible, but must also be very robust at the same time.

It was therefore the object of the present invention to make available an adjusting mechanism which has these properties.

The object is achieved with an adjusting mechanism with a supporting structure which can be moved relative to a base element, wherein a plurality of web pairs are provided between the supporting structure and the base element and the angle of the webs of each web pair to one another changes during the movement of the supporting structure.

The adjusting mechanism according to the invention is suitable for any linear adjustment but also for an adjustment along a slightly curved path.

SUMMARY

The present invention relates to an adjusting mechanism which is provided, for example, on the body of a motor vehicle or on a further interior fittings part of a motor vehicle, for example a vehicle seat or the interior trim of the motor vehicle.

The supporting structure of this adjusting mechanism can be moved relative to a base element, in particular with a purely translational movement. For this purpose, a plurality of web pairs are provided between the supporting structure and the base element, wherein the angle of the webs of each web pair to one another changes during the movement of the supporting structure.

The base element is preferably fixedly provided, for example connected to the vehicle body or another vehicle interior fittings part. However, it is also possible that the base part is provided so as to be movable, this movement preferably taking place independently of the movement of the supporting structure and particularly preferably being provided at an angle thereto.

The adjusting mechanism is preferably at least partially, particularly preferably completely, produced from plastic. It is particularly preferably an injection-molded part or injection-molded/cast part.

The adjusting mechanism, in particular at least the base element, the supporting structure and the web pair(s), is particularly preferably provided in one piece.

A film hinge is in each case preferably provided between the webs themselves and/or between the web and the base element and/or the supporting structure. The web rotates in each case about such a film hinge. The axis of rotation of each film hinge is preferably provided perpendicular to the direction of movement of the supporting structure.

At least two web pairs are preferably connected to one another by a compensating lever which synchronizes the movement of two web pairs. It is prevented in the case of this preferred embodiment that the supporting structure tilts during its movement.

In a preferred embodiment, the base element has a first and a second side, with web pairs being provided on each side. This embodiment is particularly rigid. The web pairs on both sides of the base element are preferably in each case connected to one another by a compensating lever. It is furthermore preferable for the two compensating levers to be synchronized with one another. This preferably takes place by means of at least one connecting means between the compensating levers. The ends of this connecting means are preferably in each case connected via a film hinge to in each case one of the compensating levers.

The adjusting mechanism according to the invention can be used for any linear or slightly curved adjustment of a component.

The adjusting mechanism is preferably part of the interior fitting of a motor vehicle and can be used there for any linear or slightly curved adjustment of a component.

The adjusting mechanism is particularly preferably part of a head restraint. In this embodiment, the base element is preferably provided by means of one or more rods on the backrest of a motor vehicle seat. For comfort purposes or for safety reasons, the supporting structure can be moved toward the head of a seat occupant and away therefrom. The head restraint is preferably height-adjustable and/or angularly adjustable so that it can be adapted to the body size of the particular seat occupant. The supporting structure is generally provided with a cover and/or a cushioning. In the case that the webs are arranged with one or more film hinges on the base element, the supporting structure and/or the compensating lever, the axis of rotation of each of these film hinges is oriented very particularly preferably substantially parallel or perpendicular to the holding rods.

In a preferred embodiment, the base element has a first and a second side, with web pairs being provided on each side. The two sides are preferably provided parallel to the holding rods.

According to a further preferred embodiment, the adjusting mechanism is part of a display by means of which the position of the display is adjustable for example relative to a vehicle interior fittings part, in particular the interior trim. Here, the base part is preferably connected to the interior fitting and the supporting structure is preferably connected to the display.

According to a further preferred embodiment, the adjusting mechanism is the height adjuster of a vehicle seat. The base part here is preferably connected directly or indirectly to the body of the vehicle and the supporting structure is connected to the vehicle seat.

According to yet a further preferred embodiment, the adjusting mechanism is part of the linear adjustment of an armrest. The base part here is preferably connected directly or indirectly to the body or the trim of the vehicle and the supporting structure is connected to the armrest.

DRAWINGS

The invention will be explained below with reference to FIGS. 1 and 2. These explanations are merely by way of example and do not limit the general idea of the invention.

DETAILED DESCRIPTION

Figure 1A:
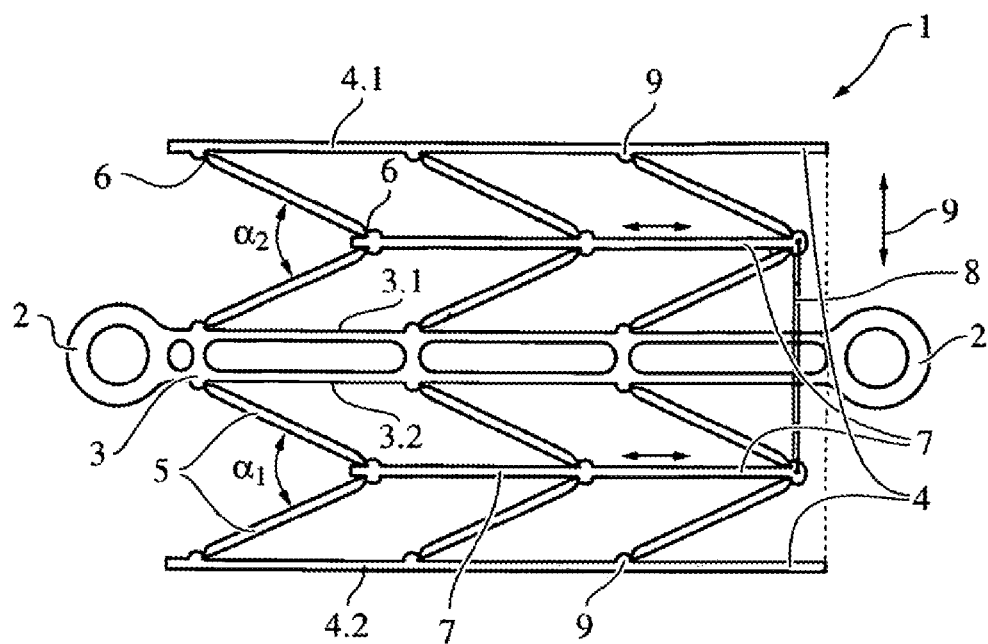
FIG. 1A shows a top view of a first embodiment of the adjusting mechanism.
Figure 1B:
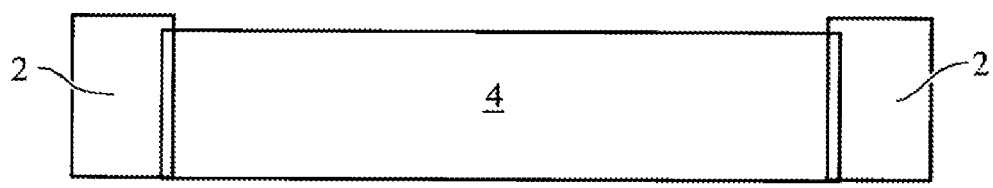
FIG. 1B shows a side view of the first embodiment of the adjusting mechanism.

FIG. 1A and FIG. 1B show the adjusting mechanism 1 according to a first embodiment of the invention, for example as part of a head restraint. The adjusting mechanism has a base element 3, here a plate, on each of its right and left ends is provided the receptacle for a respective holding rod. Furthermore, the adjusting mechanism according to the invention has a supporting structure 4 which in the present case comprises at least a front plate 4.1 and a rear plate 4.2 whose spacing remains unchanged during all adjusting operations and which can be provided in one piece. The base element has a first side 3.1, which in the present case is oriented parallel to the front plate 4.1, and a second side 3.2, which in the present case is oriented parallel to the rear plate 4.2. A plurality, here three, web pairs 5 are now in each case arranged parallel to one another between the two sides 3.1, 3.2 and the front plate 4.1 or the rear plate 4.2. Each web pair comprises two webs which are in each case connected at their one end to the base element 3 or the front plate 4.1 or the rear plate 4.2 and by their other end to in each case a compensating lever 7. The connection to the base element, the front plate 4.1/rear plate 4.2 or the compensating lever 7 in each case takes place by means of film hinges 6. If it is now intended for example for the front plate 4.1 to be moved in the direction of the seat occupant's head, the seat occupant pulls on the supporting structure 4, in particular on the front plate 4.1. Here, the angle $\alpha_2$ simultaneously increases and the angle $\alpha_1$ decreases, with the result that the spacing between the front plate 4.1 and the rear plate 4.2 remains constant during the movement, but the spacing between the front plate 4.1 and the base element 3 increases. If it is intended for the supporting structure to be moved relative to the base element 3 away from the seat occupant's head, the angle $\alpha_1$ increases and the angle $\alpha_2$ decreases. The web pairs which are provided between the first side 3.1 of the base element and the front plate 4.1 and the web pairs which are provided between the second side 3.2 of the base element and the rear plate 4.2 are in each case connected to one another by a compensating lever 7 which makes the movement of the web pairs uniform in each case on one side of the base element 3. In a preferred embodiment, these compensating levers 7 are additionally also connected to one another by a synchronizing lever 8. The base element 3, the webs 5, the supporting structure 4 and the compensating levers 7 are preferably provided in one piece and/or produced in particular as an injection-molded part from plastic. The entire adjusting mechanism illustrated is preferably produced from plastic. The adjusting mechanism represented is particularly preferably in one piece, at least apart from the synchronizing lever 8, in particular configured as a plastic part.

Figure 2A:
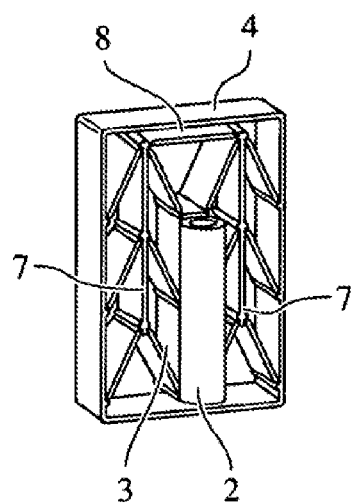
FIG. 2A shows a perspective view of a second embodiment of the adjusting mechanism.
Figure 2B:
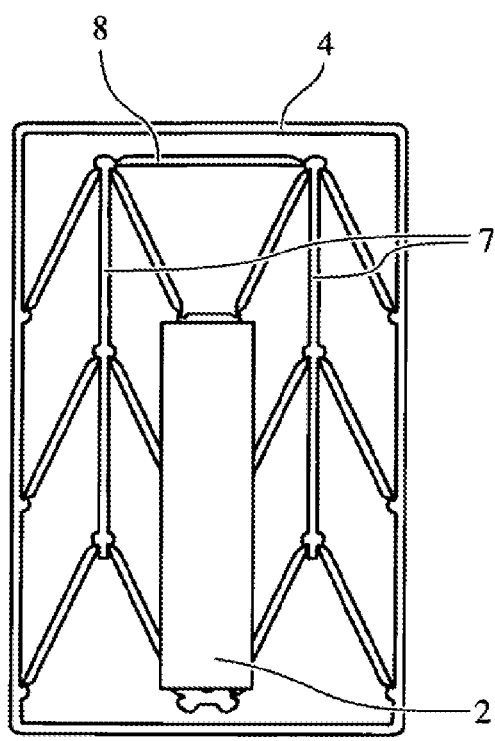
FIG. 2B shows a back view of the second embodiment of the adjusting mechanism.

FIG. 2A and FIG. 2B show a further embodiment of the adjusting mechanism according to the invention. The adjusting mechanism according to FIG. 2A and FIG. 2B corresponds substantially to the embodiment according to FIG. 1A and FIG. 1B, which means that reference can be made to the statements made there. In the present case, the film hinges are at a 90°-angle to the longitudinal extent of the holding rods, i.e. also rotated by 90° in comparison to the embodiment according to FIG. 1A, and the synchronizing lever 8 is likewise connected to the compensating levers 7 by means of film hinges. The entire adjusting mechanism represented is produced in one piece, preferably as a plastic part.

The invention claimed is:

1. An adjusting mechanism, comprising a supporting structure configured to move relative to a base element, wherein a first plurality of web pairs is provided between a front plate of the supporting structure and a first side of the base element, a second plurality of web pairs is provided between a rear plate of the supporting structure and a second side of the base element, an angle between a first web and a second web of each web pair of the first plurality of web pairs increases as an angle between a first web and a second web of each web pair of the second plurality of web pairs decreases, wherein spacing between the front plate and the rear plate remains constant, the web pairs of the first plurality of web pairs are connected to one another by a first compensating lever, the web pairs of the second plurality of web pairs are connected to one another by a second compensating lever, and the first compensating lever and the second compensating lever are connected to one another by a synchronizing lever.

2. The adjusting mechanism as claimed in claim 1, comprising a first film hinge between the first web of each web pair of the first and second pluralities of web pairs and the base element, and a second film hinge between the second web of each web pair of the first and second pluralities of web pairs and the supporting structure.

3. The adjusting mechanism as claimed in claim 2, wherein the base element, the first and second pluralities of web pairs, the supporting structure, and the film hinges comprise one piece.

4. The adjusting mechanism as claimed in claim 3, wherein the base element, the first and second pluralities of web pairs, the supporting structure, and the film hinges are made of plastic.

5. The adjusting mechanism as claimed in claim 2, wherein an axis of rotation of the first and second webs of each web pair of the first and second pluralities of web pairs is perpendicular to movement of the supporting structure.

6. The adjusting mechanism as claimed in claim 1, wherein the adjusting mechanism is provided in an interior of a motor vehicle.

7. The adjusting mechanism as claimed in claim 6, wherein the adjusting mechanism is part of a head restraint.

* * * * *